United States Patent [19]

Hugues et al.

[11] 4,416,518

[45] Nov. 22, 1983

[54] OBJECTIVE COMPRISING ASPHERICAL SURFACES, WHOSE FOCAL LENGTH IS VARIABLE OVER A WIDE RANGE

[75] Inventors: Edgard A. Hugues, Courbevoie; Jean-Marie Bacchus, Bagnolet, both of France; Jan Haisma, Eindhoven, Netherlands

[73] Assignee: U.S. Philips Corporation, New York, N.Y.

[21] Appl. No.: 192,158

[22] Filed: Sep. 29, 1980

[30] Foreign Application Priority Data

Sep. 28, 1979 [FR] France .................... 79 24154

[51] Int. Cl.³ .................... G02B 13/18; G02B 15/14
[52] U.S. Cl. .................... 350/427; 350/432
[58] Field of Search .................... 350/427, 432

[56] References Cited

U.S. PATENT DOCUMENTS 4,043,641 8/1977 Gottlieb .................... 350/420

FOREIGN PATENT DOCUMENTS 1196392 7/1965 Fed. Rep. of Germany ...... 350/427

Primary Examiner—John K. Corbin
Assistant Examiner—Rebecca D. Gass
Attorney, Agent, or Firm—Robert J. Kraus

[57] ABSTRACT

The objective comprises a plurality of movable lens components and at least one stationary lens component group, at least two of said components including an aspherical surface. The movable components are constituted by single lenses of which at least one lens comprises an aspherical surface, while the stationary lens component group(s) may comprise at least one aspherical surface. Steadiness of the image plane is obtained by mechanical compensation for focal-length variations with a ratio greater than five, which may readily reach the value eight. The aspherical lenses are arranged so that for the same focal length variation the total number of lenses of the objective, which may be spherical or non-spherical, is smaller than in any other variable-focus objective with a stationary image plane comprising solely spherical lenses:

This results in a reduction of the mass of the objective, namely of the movable parts, and a reduction of the power necessary for moving said parts.

Application to color television camera.

10 Claims, 19 Drawing Figures

OBJECTIVE COMPRISING ASPHERICAL SURFACES, WHOSE FOCAL LENGTH IS VARIABLE OVER A WIDE RANGE

The invention relates to a variable focus objective with stationary image plane, comprising components including lenses; at least two of said components including a lens with an aspherical surface.

German Offenlegungsschrift No. 2,625,058 describes an objective of this type. A special feature of this objective is that it comprises only two components of lenses, which are both movable.

The objective in accordance with said Offenlegungsschrift has two sorts of drawbacks. Its optical performance is limited and provides a focal-length variation with a ratio between its maximum and minimum values which is hardly greater than 2 if allowance is made for the tolerances to be satisfied for chromatic and achromatic aberrations. On the other hand, although the number of constituent elements of each component is reduced by the inclusion of an aspherical surface in each of these components, this number remains high, which complicates the mechanical construction of the objective, specifically of the part by means of which the components are to be moved relative to each other.

It is the object of the invention to mitigate these drawbacks, and specifically to increase the range of focal-length variation. The invention also employs a certain number of aspherical surfaces in order to minimize the number of elements by means of which the objective is formed, the objective being of simple mechanical construction because the movable components comprise only one element. Since the movable components comprise only one optical element they have a low mass, so that they can be moved by means also having a low mass, for example employing microprocessors.

The invention utilizes methods of "compensating" for the focal-length variation, which are used in optical systems if the image plane is to remain satisfactory.

The so-called "optical compensation" method is not used, because it only provides a simple solution for the movable components if the focal-length variation is effected with a ratio smaller than 2.

The invention employs the "mechanical" method of compensating for the focal-length variation with stationary image plane. According to this method the spacing between the components and their displacement is subject to an analytical law obtained by computation. This method is extremely suitable for compensation in the case of focal-length variations with high ratios.

In the prior art this method has already been applied using the "Delano diagram" (see the article by Besenmatter "Analyse der primären Wirkung asphärischer Flächen mit Hilfe des Delano Diagrams" in Optik 51, 1978, pages 385 to 396). A prior-art objective obtained in accordance with this compensation method is the subject of the article by D. S. Volosov, entitled: "Design of complex photographic systems" in Gostekhizdat 1948. This objective has moderate specifications: a focal-length variation of 3 to 4 and an aperture from F/3 to F/5. The invention applies said method in such a way that it is more suitable for finding solutions yielding a higher performance. First of all the powers of the various components of stationary and movable lenses were examined and the ratios which should exist between said powers in order to obtain the desired focal-length variations and apertures, using the displacement rules for each component and the ratios between the diameters of the components and their focal lengths as feasibility criteria. Thus, a so-called "focal-length evaluation" diagram is obtained. If it is desired to have an objective comprising for example two stationary components and two movable components with the respective focal lengths $F_1$, $F_4$, $F_2$, $F_3$, the focal lengths of the movable components referred to $F_1$, i.e. the ratios $F_2/F_1$ are plotted as abscissae and ordinates on the axes of a two-dimensional diagram, those portions of the diagram which yield practical solutions then being selected on basis of considerations with respect to the focal-length variation and maximum power of the objective. According to the invention, a very limited portion of the diagram has thus been selected which corresponds to focal-length variations with a ratio of at least 5. For objectives comprising three movable components similar approaches consist in setting up a three-dimensional diagram of the powers and in selecting a three-dimensional zone yielding the desired great focal-length variations.

The objective in accordance with the invention, based on said investigations, is characterized in that it comprises a plurality of movable lens components and at least one stationary lens component group, in that the aspherical lenses are arranged so that for the same focal-length variation the total number of spherical or non-spherical lenses is smaller than in any other variable-focus objective with stationary image plane solely comprising spherical lenses, the steadiness of the image plane during a focal length variation greater than five being obtained through mechanical compensation, and that at least all the movable components are constituted by single lenses, of which at least one lens comprises an aspherical surface, whilst the stationary component(s) may comprise at least one aspherical surface.

In a first embodiment the objective comprises, from the object space to the image space, a first stationary component of positive power, a first movable component constituted by a single lens of negative power, a second movable component constituted by a single movable lens of positive power, and a second stationary component of positive power.

More specifically, when $F_1$, $F_2$, $F_3$ designate the respective optical focal lengths of the first stationary component, of the first movable component and of the second movable component, the focal lengths of these different components are such that:

$$-0.25 \leq F_2/F_1 \leq -0.1$$

$$0.9 \leq F_3/F_1 \leq 2$$

In a second embodiment the objective comprises 3 movable components.

In variants of these embodiments the focal-length variation ratio reaches values greater than 8, whilst half the field angle is greater than 24°, the aperture number ranging between F/2 and F/1.5, where F designates the focal length of the objective.

Furthermore, the image distance of the objective may be substantial and may be greater than 22 mm, which in accordance with the invention enables the use of said objective in a colour camera device with a colour-separating prism included between the objective and a camera with three camera tubes.

The invention will be more fully understood by means of the following description of some embodiments which are given by way of example, said description being accompanied by explanations and drawings of which.

Figure 1:
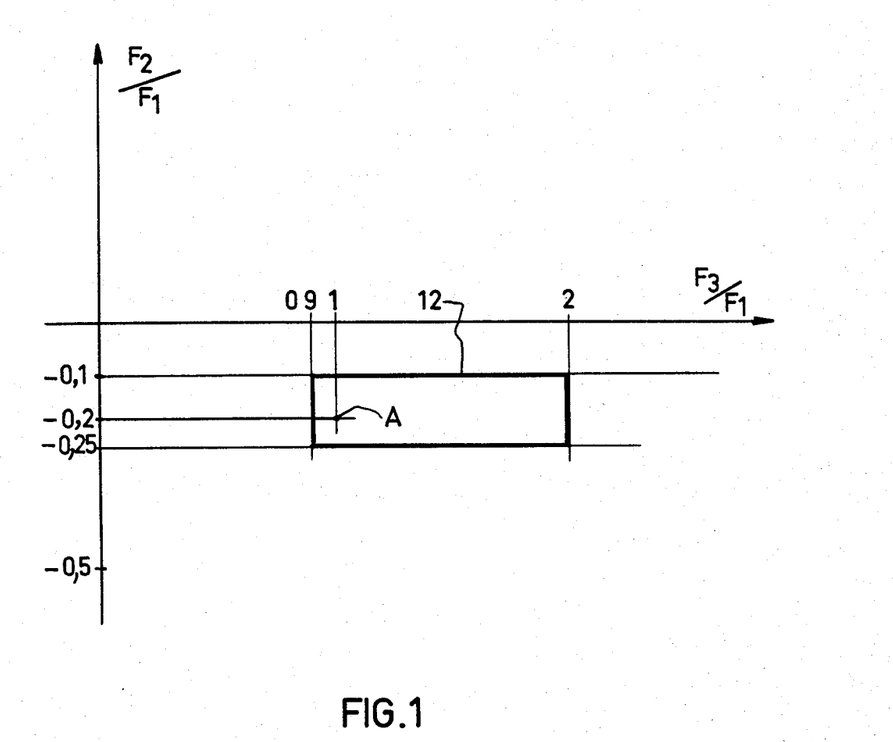
FIG. 1 represents a diagram relating to the evaluation of the focal lengths of two movable components of an objective in accordance with a first embodiment of the invention.
Figure 2A:
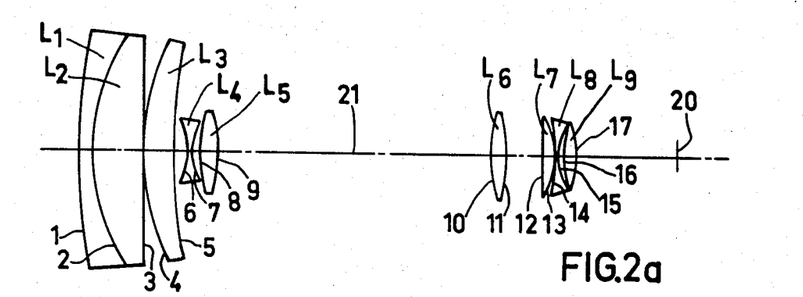
FIG. 2a, 2b, 2c, 2d represent the optical diagram of a first example of an objective with two movable components in accordance with the first embodiment of the invention, each of said Figures, in this order, corresponding to a value of the focal-length of the objective from its minimum to its maximum.
Figure 2B:
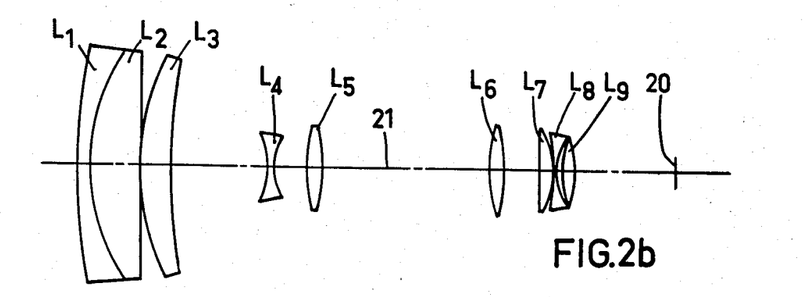
Figure 2C:
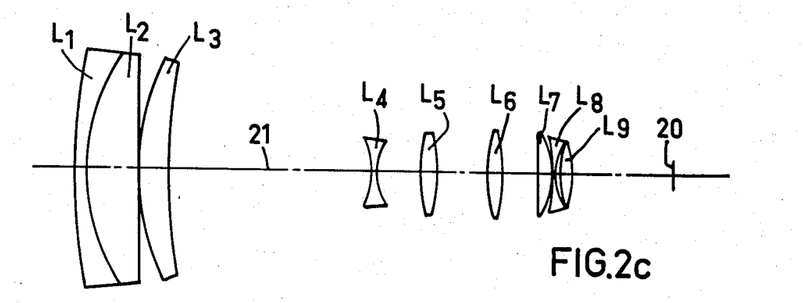
Figure 2D:
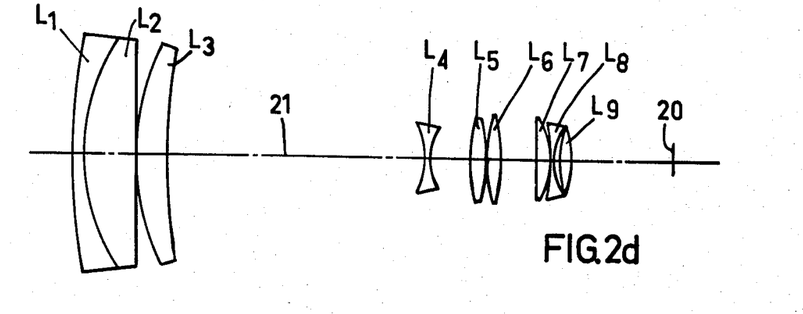
Figure 3A:
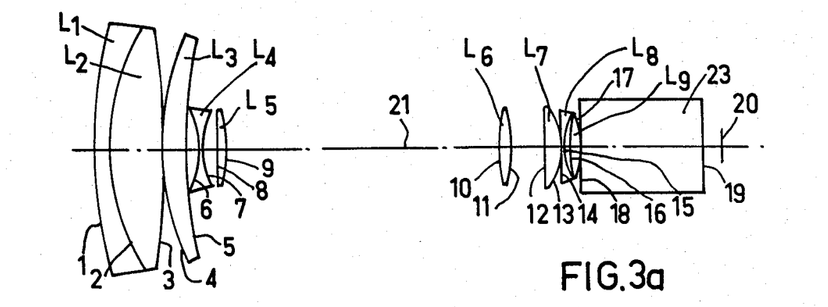
FIG. 3a, 3b, 3c, 3d show the optical diagram of a second example of an objective with two movable components in accordance with the first embodiment of the invention, each of said Figures, in this order, corresponding to a value of the focal length of the objective from its minimum to its maximum.
Figure 3B:
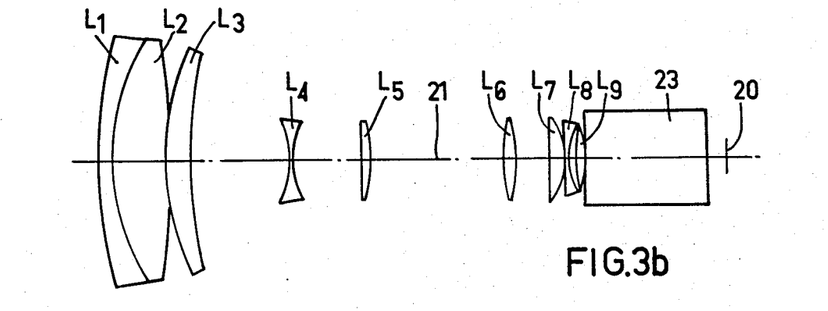
Figure 3C:
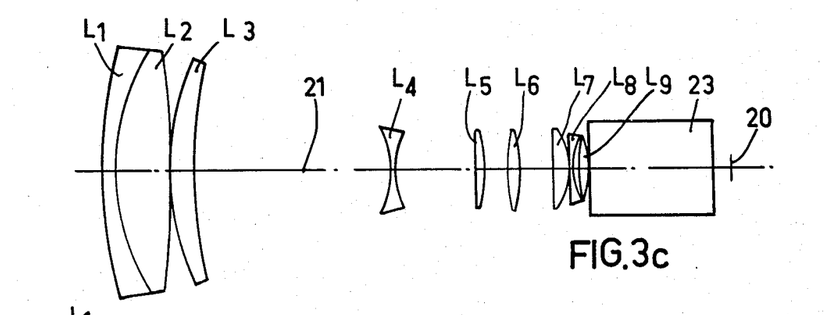
Figure 3D:
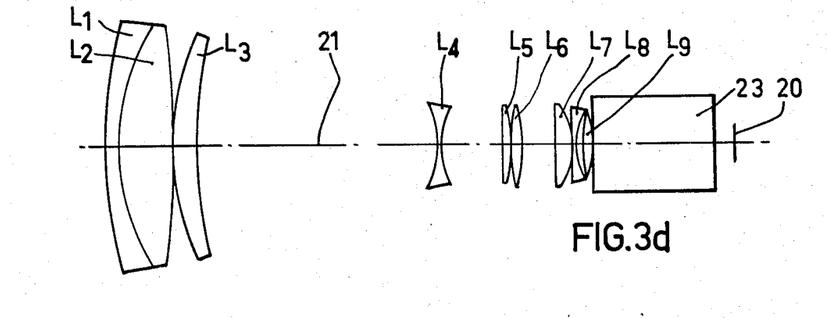
Figure 4A:
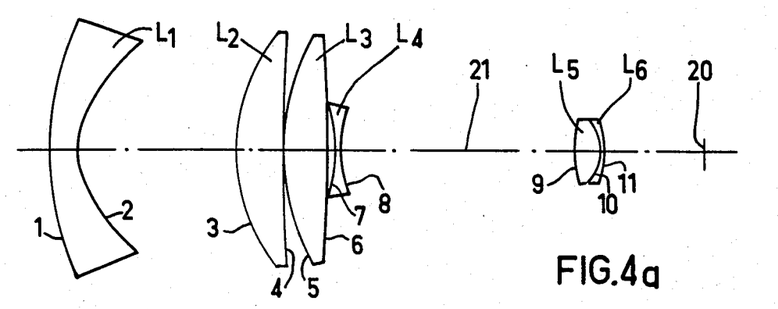
FIGS. 4a, 4b, 4c, 4d represent the optical diagram of a first example of an objective with three movable components in accordance with the second embodiment of the invention, each of said Figures, in this order, corresponding to a value of the focal length of the objective from its minimum to its maximum.
Figure 4B:
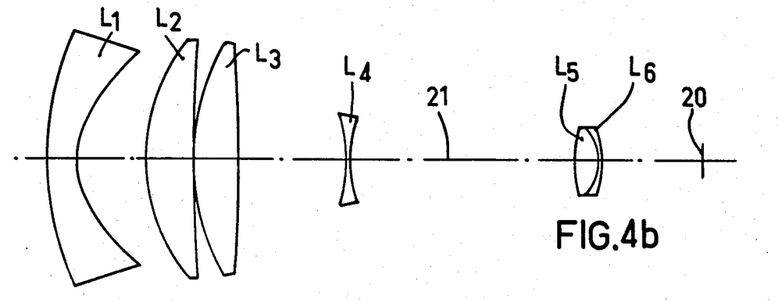
Figure 4C:
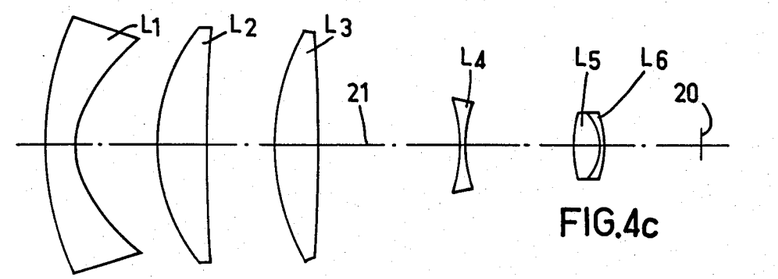
Figure 4D:
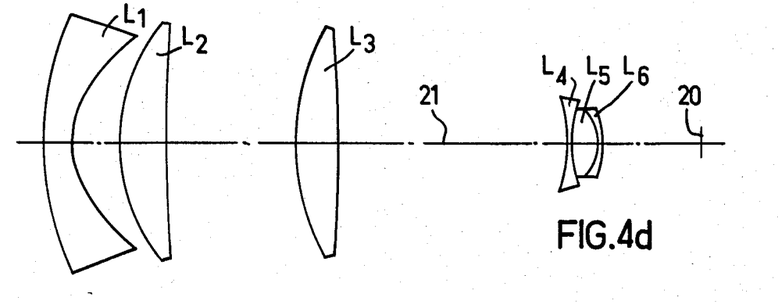

FIG. 1 relates to a first embodiment of the objective, which comprises two movable components between two stationary components. The focal lengths of the stationary components are $F_1$ and $F_4$ and those of the movable components $F_2$ and $F_3$. In a rectangular system of axes the ratios $F_3/F_1$ and $F_2/F_1$ are respectively plotted as abscissae and ordinates and the evaluation diagram for the focal lengths for said objective is drawn up. In accordance with the invention that zone in said diagram is selected which has a rectangular outline 12 defined by the relations:

$$-0.25 \leq F_2/F_1 \leq -0.1$$

$$0.9 \leq F_3/F_1 \leq 2$$

The points within 12 correspond to variable-focus objectives with a fixed image plane, which exhibit large fields of view of the order of 45° and focal-length variations of the order of 8. One of the best compromises for said objective is situated near point A in FIG. 1 with the coordinates:

$$(1) \begin{cases} \dfrac{F_2}{F_1} = -0.2 \\ \dfrac{F_3}{F_1} = 1 \\ \text{with } F_1 > 0 \end{cases}$$

This corresponds to an image size with a diagonal of 7 mm and an aperture of F/1.8, F being the focal length of the objective, which has a minimum value of the order of 6 to 8 mm and with a size, including the image distance, of the order of 140 mm. FIGS. 2a, 2b, 2c, 2d represent a first example corresponding to this particular case, said Figures corresponding to focal length values of F=7.95 mm, F=15.00 mm, F=35 mm, and F=63.5 mm respectively. In these Figures the optical axis of the objective is designated 21 and the image field is designated 20. The dioptric surfaces of the objective elements are designates 1 to 17 reckoned from the object field to the image field. The stationary component with a positive focal length $F_1$ is constituted by the lenses $L_1$, $L_2$, $L_3$, whilst the stationary component with a focal length $F_4$ is constituted by four lenses $L_6$ to $L_9$. The lenses $L_1$, $L_2$ constitute a convergent glued doublet, whilst the lens $L_3$ is a convergent meniscus lens. In the stationary component with the focal length $F_4$ the lens $L_6$ is convergent, its entrance surface 10 being aspherical, and the lenses $L_7$, $L_8$, $L_9$ constitute a nonglued triplet, the lens $L_7$ being convergent and substantially plano-convex, the lens $L_8$ being divergent and substantially plano-concave, and the lens $L_9$ being convergent and substantially equiconvex. The movable components are respectively constituted by a divergent lens $L_4$ with a focal length $F_2$ and a convergent lens $L_5$ with a focal length $F_3$. Each of said lenses comprises an aspherical surface, respectively corresponding to the dioptric surfaces 7 and 8. The equation of the cross-sections of the aspherical dioptric surfaces 7, 8, 10 (rotationally symmetrical about the optical axis 21) in the plane of the diagram of FIGS. 2a, 2b, 2c, 2d plotted in a rectangular system of axes (x, y), is:

$$x = \frac{Cy^2}{1 + \sqrt{1 - (1+\lambda)C^2 y^2}} + \sum_{i=2}^{i=n} \epsilon_i y^{2i} \quad (2)$$

the abscissae x being measured from the apex of the dioptric surface on the positively oriented optical axis of the lens $L_1$ towards the image field 20 and the ordinates y being measured perpendicularly to the optical axis. The right-hand side of said equation comprises a first term corresponding to a conic section with an apex C and a coefficient $\lambda$ and a second term describing distortions, higher than the second order, of the dioptric surface relative to said conic section. The Tables I and II give the construction parameters of said objective. The Table I indicates the distances E between two consecutive dioptric surfaces for the focal distance F=7.95 mm, the radius of curvature R of the dioptric surfaces, the index of refraction n of the materials, and the Abbe number $\nu$ relating to their dispersion. When the dioptric surface is aspherical, the column R indicates the radius of the circle of osculation to said surface on the optical axis. The Table II specifies the values C, $\lambda$ and $\epsilon_i$ of the equation (2) relating to each aspherical surface developed up to the order 2n=10. The total length of the objective is 108.25 mm, whilst its image distance (distance available between the last dioptric surface and the image plane) is 22.14 mm.

TABLE I

| Dioptric surface | E (mm) | R (mm) | n | ν |
|---|---|---|---|---|
| 1 | | 111.111 | | |
| | 2.962 | | 1.704485 | 29.88 |
| 2 | | 43.910 | | |
| | 11.099 | | 1.622857 | 60.11 |
| 3 | | 876.647 | | |
| | 0.050 | | 1.000000 | |
| 4 | | 53.395 | | |
| | 6.503 | | 1.622857 | 60.11 |
| 5 | | 129.296 | | |
| | 2.936 | | 1.000000 | |
| 6 | | −17.988 | | |
| | 1.113 | | 1.591288 | 60.94 |
| 7 | | 8.261 | | |
| | 1.896 | | 1.000000 | |
| 8 | | 35.029 | | |
| | 3.542 | | 1.550192 | 53.17 |
| 9 | | −39.013 | | |
| | 59.841 | | 1.000000 | |
| 10 | | 25.384 | | |
| | 2.982 | | 1.654137 | 38.91 |
| 11 | | −62.563 | | |
| | 7.889 | | 1.000000 | |
| 12 | | 309.102 | | |
| | 3.025 | | 1.622857 | 60.11 |
| 13 | | −18.230 | | |
| | 0.050 | | 1.000000 | |
| 14 | | −68.031 | | |
| | 0.802 | | 1.812529 | 25.30 |
| 15 | | 13.760 | | |
| | 1.032 | | 1.000000 | |
| 16 | | 25.702 | | |
| | 2.726 | | 1.622857 | 60.11 |
| 17 | | −30.820 | | |
| | 0.000 | | 1.000000 | |

Focal-length variation F: 7.95 to 63.50 mm
Image distance: 22.14 mm
Objective length: 108.25 mm

TABLE II

| Dioptric surface | 7 | 8 | 10 |
|---|---|---|---|
| C | $1{,}21048 \cdot 10^{-1}$ | $2{,}85479 \cdot 10^{-2}$ | $3{,}93954 \cdot 10^{-2}$ |
| λ | $-1{,}42139$ | $-1{,}07632$ | $-2{,}90598$ |
| $\epsilon_2$ | $-1{,}68578 \cdot 10^{-4}$ | $-1{,}89696 \cdot 10^{-5}$ | $-2{,}27969 \cdot 10^{-5}$ |
| $\epsilon_3$ | $2{,}73671 \cdot 10^{-6}$ | $3{,}04327 \cdot 10^{-7}$ | $-1{,}91999 \cdot 10^{-7}$ |
| $\epsilon_4$ | $-6{,}58215 \cdot 10^{-8}$ | $-5{,}01920 \cdot 10^{-9}$ | $1{,}14049 \cdot 10^{-9}$ |
| $\epsilon_5$ | $5{,}46590 \cdot 10^{-10}$ | $2{,}90044 \cdot 10^{-11}$ | $-1{,}55755 \cdot 10^{-11}$ |

FIGS. 3a, 3b, 3c, 3d represent a second example of said first embodiment of the invention, which satisfies the relations (1) concerning the focal length, for a value of the focal length of F=8 mm, F=15 mm, F=35 mm and F=64 mm respectively. The structure of the objective is similar to that shown in FIGS. 2a, 2b, 2c, 2d, except that in this case a colour-splitting prism, known per se, is incorporated in the objective on the image-field side in such a way that the red, blue and green spectral components of the image are obtained spaced from each other. In FIGS. 3a, 3b, 3c, 3d the dioptric surfaces of the elements are designated 1 to 20, including the image field. In these Figures the shapes of the lenses $L_1$ to $L_9$ are found to be similar, the surfaces 7, 8, 10 being aspherical but having different construction parameters to allow for presence of the trichromatic separating prism. In each of the FIGS. 3a, 3b, 3c, 3d the movable lenses $L_4$ and $L_5$ are represented in a different position corresponding to one of the values of the focal length of the objective indicated in the foregoing. The reference numeral 23 designates the colour-splitting prism, which is schematically represented as a segment with parallel surfaces. The Tables III and IV, which correspond to Tables I and II, indicate the construction parameters relating to said second example, the equations for the sections of the aspherical dioptric surfaces being of the same form as (2). Table III relates to the value of the focal length F=7.90 mm. The total length of the objective, including the prism, is found to be 131.66 mm, the available image distance after the prism being 4.25 mm.

TABLE III

| Dioptric surface | E (mm) | R | n | ν |
|---|---|---|---|---|
| 1 | | 115.145 | | |
| | 2.935 | | 1.723153 | 29.26 |
| 2 | | 46.191 | | |
| | 11.768 | | 1.622857 | 60.11 |
| 3 | | −248.840 | | |
| | 0.050 | | 1.000000 | |
| 4 | | 63.147 | | |
| | 5.243 | | 1.622857 | 60.11 |
| 5 | | 135.414 | | |
| | 2.507 | | 1.000000 | |
| 6 | | −19.756 | | |
| | 0.688 | | 1.591288 | 60.94 |
| 7 | | 11.786 | | |
| | 3.279 | | 1.000000 | |
| 8 | | 237.568 | | |
| | 1.680 | | 1.584777 | 40.53 |
| 9 | | −51.002 | | |
| | 59.431 | | 1.000000 | |
| 10 | | 42.857 | | |
| | 2.329 | | 1.584777 | 40.53 |
| 11 | | −31.066 | | |
| | 7.373 | | 1.000000 | |
| 12 | | 550.809 | | |
| | 3.487 | | 1.622857 | 60.11 |
| 13 | | −16.221 | | |
| | 0.040 | | 1.000000 | |
| 14 | | −401.781 | | |
| | 0.788 | | 1.812529 | 25.30 |
| 15 | | 13.928 | | |
| | 1.259 | | 1.000000 | |
| 16 | | 42.759 | | |
| | 2.200 | | 1.622857 | 60.11 |
| 17 | | −26.586 | | |
| | 0.050 | | 1.000000 | |
| 18 | | ∞ | | |
| | 26.500 | | 1.518727 | 64.04 |
| 19 | | ∞ | | |
| | 0.000 | | 1.000000 | |

Focal-length variation F: 7.90 to 64 mm.
Image distance after prism: 4.25 mm.
Length: 131.66 mm.

TABLE IV

| Dioptric surface | 7 | 8 | 10 |
|---|---|---|---|
| C | $8{,}48454 \cdot 10^{-2}$ | $4{,}20932 \cdot 10^{-3}$ | $2{,}33336 \cdot 10^{-2}$ |
| λ | $-8{,}64111 \cdot 10^{-1}$ | $-6{,}87745 \cdot 10^{-2}$ | $-5{,}06288$ |
| $\epsilon_2$ | $-1{,}01718 \cdot 10^{-4}$ | $2{,}05245 \cdot 10^{-6}$ | $-7{,}45166 \cdot 10^{-5}$ |
| $\epsilon_3$ | $-1{,}33362 \cdot 10^{-7}$ | $-4{,}29973 \cdot 10^{-8}$ | $-2{,}89507 \cdot 10^{-7}$ |
| $\epsilon_4$ | $-1{,}23607 \cdot 10^{-8}$ | $1{,}41858 \cdot 10^{-9}$ | $1{,}75248 \cdot 10^{-9}$ |
| $\epsilon_5$ | $1{,}19575 \cdot 10^{-10}$ | $-1{,}73662 \cdot 10^{-11}$ | $-5{,}15778 \cdot 10^{-11}$ |

It is evident that in these examples use can be made of any other combination of stationary components in accordance with the prior art which is compatible with the nature of the movable components constituted by the lenses $L_4$ and $L_5$ respectively.

In a second embodiment of the invention the objective comprises 3 movable components between two stationary components. The focal lengths of the stationary components, from the object field towards the image field, are in this order $F_1$ and $F_5$, those of the movable components $F_2$, $F_3$, $F_4$. A preliminary evaluation of the powers demonstrates that in accordance with the invention the elements of the objective should be selected so that the ratios $F_2/F_1$, $F_3/F_1$, $F_4/F_1$ should be situated between certain limits.

In accordance with a variant of this embodiment, for which the first stationary component has a negative focal length $F_1$, these limits are such that:

$$-0.7 \leq F_2/F_1 \leq 0.3$$

$$-1 \leq F_3/F_1 \leq 0.4$$

$$0.12 \leq F_4/F_1 \leq 0.3$$

An example of an objective in accordance with this variant is that corresponding to $$F_2/F_1 = -0.385; \quad F_3/F_1 = -0.500; \quad F_4/F_1 = -0.150$$

This objective is shown in FIGS. 4a, 4b, 4c, and 4d, which correspond to values of the focal length of $F=7$ mm, $F=14$ mm, $F=28$ mm and $F=56$ mm respectively.

The stationary component of a focal length $F_1$ is constituted by the diversing meniscus lens $L_1$, whilst the component with a focal length $F_5$ is constituted by the combined converging and diverging lenses $L_5$ and $L_6$ respectively. The 3 movable components are each constituted by a lens $L_2$, $L_3$ and $L_4$ respectively, $L_2$ being a quasi plano-convex converging lens, $L_3$ a biconvex converging lens and $L_4$ a biconcave diverging lens. The dioptric surfaces of all the elements are designated 1 to 11 from the object field to the image field. The surfaces of the elements $L_1$, $L_2$, $L_3$, $L_4$, $L_5$ corresponding to the respective dioptric surfaces 2, 3, 5, 8, 9 are aspherical. In FIGS. 4a, 4b, 4c, 4d the movable lenses $L_2$, $L_3$ and $L_4$ are represented in a position corresponding to one of the previously stated focal lengths. The construction parameters of the ovjective are given in Tables V and VI in analog to the preceding Tables III and IV. In Table V the focal length considered has the minimum value $F=7$ mm. The maximum value is $F=56$ mm. The image distance is 22.19 mm.

TABLE V

| Dioptric surface | E (mm) | R (mm) | n | ν |
|---|---|---|---|---|
| 1 | | 62.852 | | |
| | 6.300 | | 1.677623 | 32.08 |
| 2 | | 17.997 | | |
| | 31.400 | | 1.000000 | |
| 3 | | 31.080 | | |
| | 10.395 | | 1.622857 | 60.11 |
| 4 | | 403.858 | | |
| | 1.100 | | 1.000000 | |
| 5 | | 50.717 | | |
| | 9.458 | | 1.622857 | 60.11 |
| 6 | | −279.735 | | |
| | 1.750 | | 1.000000 | |
| 7 | | −33.369 | | |
| | 0.866 | | 1.622857 | 60.11 |
| 8 | | 21.567 | | |
| | 52.400 | | 1.000000 | |
| 9 | | 18.083 | | |
| | 5.662 | | 1.622857 | 60.11 |
| 10 | | −10.914 | | |
| | 0.396 | | 1.812529 | 25.30 |
| 11 | | −21.976 | | |
| | 0.000 | | 1.000000 | |

Focal-length variation F: 7.0 to 56.0 mm
Image distance: 22.19 mm
Length: 120.42 mm.

TABLE VI

| Dioptric surface | 2 | 3 | 5 | 8 | 9 |
|---|---|---|---|---|---|
| C | $5.55650 \cdot 10^{-2}$ | $3.21750 \cdot 10^{-2}$ | $1.97173 \cdot 10^{-2}$ | $4.63672 \cdot 10^{-2}$ | $5.53002 \cdot 10^{-2}$ |
| λ | $-6.96979 \cdot 10^{-1}$ | $-1.13548$ | $-9.75088 \cdot 10^{-1}$ | $-1.52017 \cdot 10^{-1}$ | $-7.10788 \cdot 10^{-1}$ |
| $\epsilon_2$ | $-5.38859 \cdot 10^{-6}$ | $-9.88210 \cdot 10^{-7}$ | $1.30489 \cdot 10^{-6}$ | $-1.14601 \cdot 10^{-5}$ | $-1.99591 \cdot 10^{-5}$ |
| $\epsilon_3$ | $-9.03598 \cdot 10^{-9}$ | $-1.03273 \cdot 10^{-9}$ | $-3.89438 \cdot 10^{-10}$ | $9.99829 \cdot 10^{-8}$ | $2.71237 \cdot 10^{-8}$ |
| $\epsilon_4$ | $3.92014 \cdot 10^{-12}$ | $1.46391 \cdot 10^{-12}$ | $-6.31723 \cdot 10^{-13}$ | $-8.14572 \cdot 10^{-10}$ | $1.99891 \cdot 10^{-9}$ |
| $\epsilon_5$ | 0.00000 | 0.00000 | 0.00000 | 0.00000 | 0.00000 |

Figure 5:
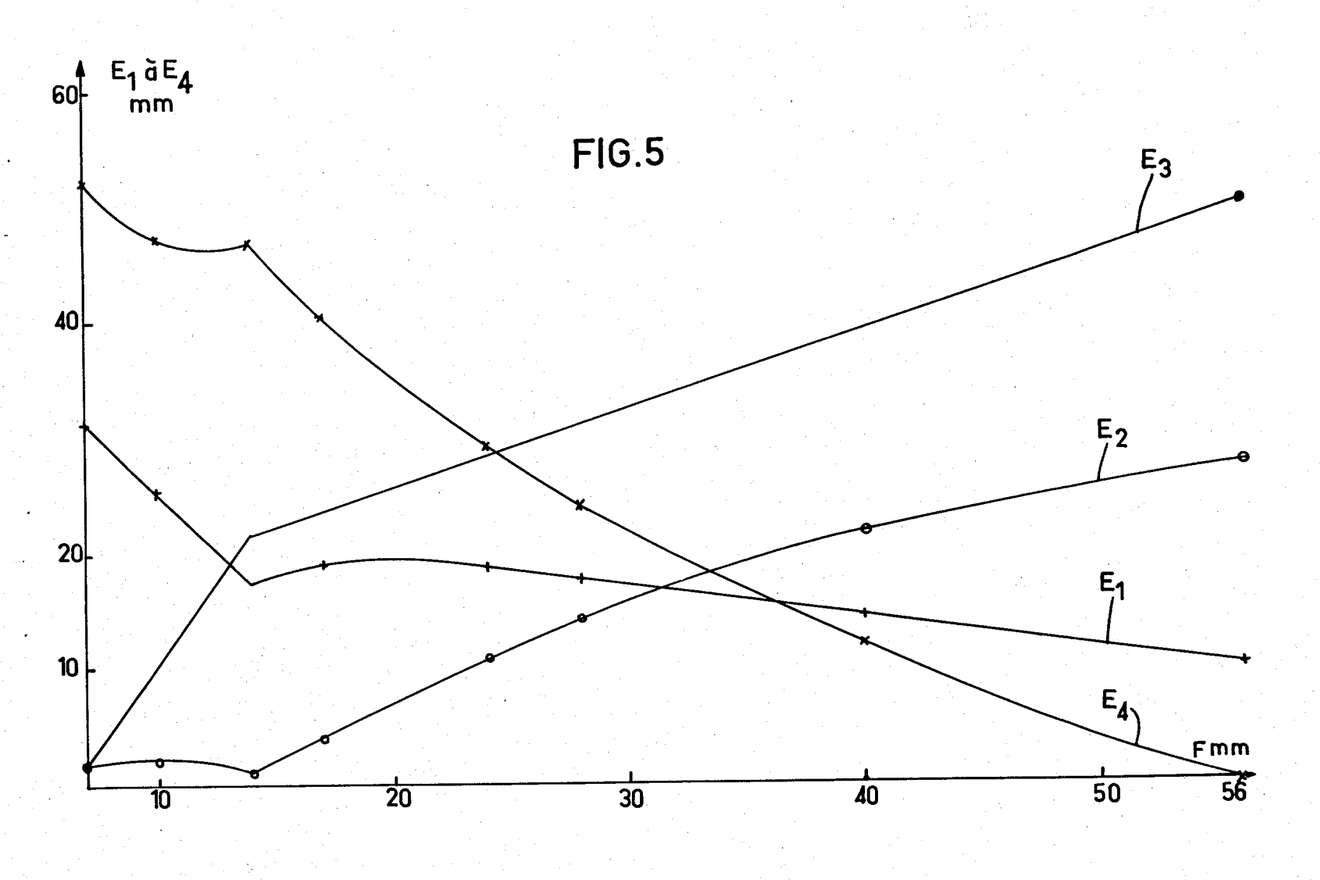
FIG. 5 represents a diagram relating to the movement of the movable components of the objectives of FIGS. 4a, 4b, 4c, 4d.
Figure 6A:
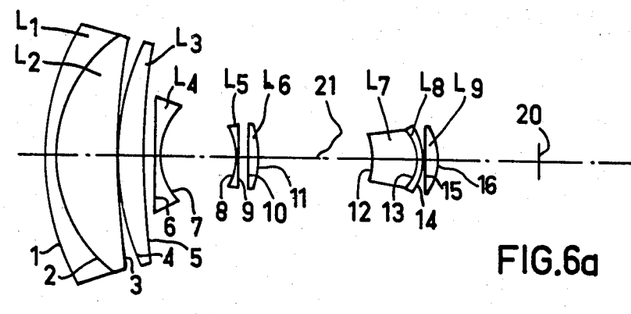
FIGS. 6a, 6b, 6c, 6d: show the optical diagram of a second example of an objective with three movable components in accordance with the second embodiment of the invention, each of said Figures, in this order, corresponding to a value of the focal length of the objective from its minimum to its maximum.
Figure 6B:
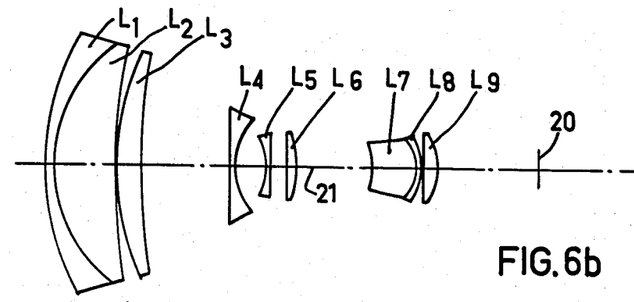
Figure 6C:
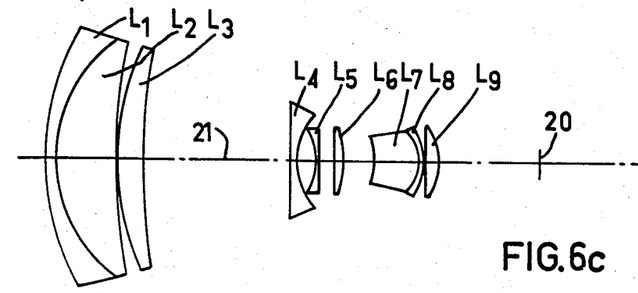
Figure 6D:
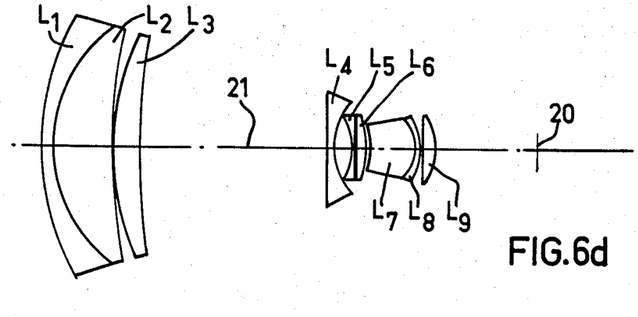

In order to complete the description of the construction of said example of an objective, FIG. 5 is a diagram illustrating the movements of the lenses $L_2$, $L_3$, $L_4$ as a function of the value of the focal lengths F. The rules governing said movements are based on variations of the axial distances between certain stationary and movable dioptric surfaces and between certain movable dioptric surfaces, namely
$E_1$ between the dioptric surfaces 2 and 3
$E_2$ between the dioptric surfaces 4 and 5
$E_3$ between the dioptric surfaces 6 and 7
$E_4$ between the dioptric surfaces 8 and 9.

In the second variant of the embodiment of the objective with three movable components between two stationary components, when proceeding from the object space to the image space, the first stationary component has a positive focal length $F_1$ and the second stationary component a positive focal length $F_5$, whilst for the movable components, each constituted by a single element, the first one has a negative focal length $F_2$, the second one a negative focal length $F_3$ and the third component a positive focal length $F_4$. In accordance with the invention, a preliminary evaluation of the focal lengths of the movable components relative to those of the first stationary components, results in the selection of the focal lengths in such a way that the following inequalities are satisfied.

$$-0.5 \leq F_2/F_1 \leq -0.2$$

$$-0.5 \leq F_3/F_1 \leq -0.2$$

$$0.3 \leq F_4/F_1 \leq 0.8$$

FIGS. 6a, 6b, 6c, 6d given an example of said variant for different focal-length values, namely corresponding to $$F_2/F_1 = 0.301; \quad F_3/F_1 = 0.326; \quad F_4/F_1 = 0.455$$

In these Figures the dioptric surfaces are designated 1 to 16 from the object field towards the image field. The first stationary component with a positive focal length $F_1$ is constituted by two combined lenses $L_1$, $L_2$, which are divergent and convergent respectively, the lens $L_3$ being convergent. The second stationary component with a positive focal length $F_5$ comprises the convergent assembly constituted by the very thick lens $L_7$ and the lens $L_8$, which are cemented to each other, and the convergent lens $L_9$. In each of the FIGS. 6a, 6b, 6c, 6d the movable components $L_2$, $L_3$, $L_4$ are shown in a different position, corresponding to focal-length values of the objective of F=7.5 mm, F=15 mm, F=13 mm and F=60 mm respectively. The first movable component with a negative focal length $F_2$ is the lens $L_4$, which is substantially planoconcave, the second movable component with a negative focal length $F_3$ is constituted by th lens $L_5$ which is also substantially planoconcave. The biconvex lens $L_6$ constitutes the third movable component with a positive focal length $F_4$. The lens surfaces corresponding to the dioptric surfaces 4, 7, 12 and 16 are aspherical. The Tables VII and VIII, which are analogous to the preceding sets of tables, give the construction parameters for this example, Table VII relating to a focal length value of F=15.00 mm.

TABLE VII

| Dioptric surface | E (mm) | R (mm) | n | ν |
|---|---|---|---|---|
| 1 | | 52.985 | | |
| | 2.499 | | 1.734359 | 28.17 |
| 2 | | 31.271 | | |
| | 13.466 | | 1.622857 | 60.11 |
| 3 | | 180.118 | | |
| | 0.050 | | 1.000000 | |
| 4 | | 60.986 | | |
| | 5.533 | | 1.622857 | 60.11 |
| 5 | | 184.952 | | |
| | 19.067 | | 1.00000 | |
| 6 | | −318.707 | | |
| | 0.940 | | 1.591288 | 60.94 |
| 7 | | 11.422 | | |
| | 7.021 | | 1.000000 | |
| 8 | | −10.909 | | |
| | 0.636 | | 1.591288 | 60.94 |
| 9 | | −136.669 | | |
| | 3.649 | | 1.000000 | |
| 10 | | 135.620 | | |
| | 1.848 | | 1.734359 | 28.17 |
| 11 | | −24.210 | | |
| | 16.404 | | 1.000000 | |
| 12 | | −39.414 | | |
| | 10.000 | | 1.615176 | 58.34 |
| 13 | | −7.702 | | |
| | 0.705 | | 1.812529 | 25.30 |
| 14 | | −13.685 | | |
| | 0.969 | | 1.000000 | |
| 15 | | −99.112 | | |
| | 2.417 | | 1.622857 | 60.11 |
| 16 | | −14.931 | | |
| | 000 | | 1.000000 | |

Focal-length variation F: 7.5 to 60 mm.
Image distance: 22.20 mm.
Length: 85.20 mm.

TABLE VIII

| Dioptric surface | 4 | 7 | 12 | 16 |
|---|---|---|---|---|
| C | $1.63972 \cdot 10^{-2}$ | $8.75499 \cdot 10^{-2}$ | $-2.53715 \cdot 10^{-2}$ | $-6.69741 \cdot 10^{-2}$ |
| λ | $-1.68233 \cdot 10^{-1}$ | $-7.55918 \cdot 10^{-1}$ | 0.00000 | 0.00000 |
| $\epsilon_2$ | $-5.59326 \cdot 10^{-8}$ | $1.61978 \cdot 10^{-5}$ | $-2.23860 \cdot 10^{-4}$ | $-3.68018 \cdot 10^{-6}$ |
| $\epsilon_3$ | $1.64888 \cdot 10^{-10}$ | $-4.29937 \cdot 10^{-7}$ | $-1.06579 \cdot 10^{-6}$ | $2.28552 \cdot 10^{-8}$ |
| $\epsilon_4$ | 0.00000 | 0.00000 | 0.00000 | 0.00000 |
| $\epsilon_5$ | 0.00000 | 0.00000 | 0.00000 | 0.00000 |

Figure 7:
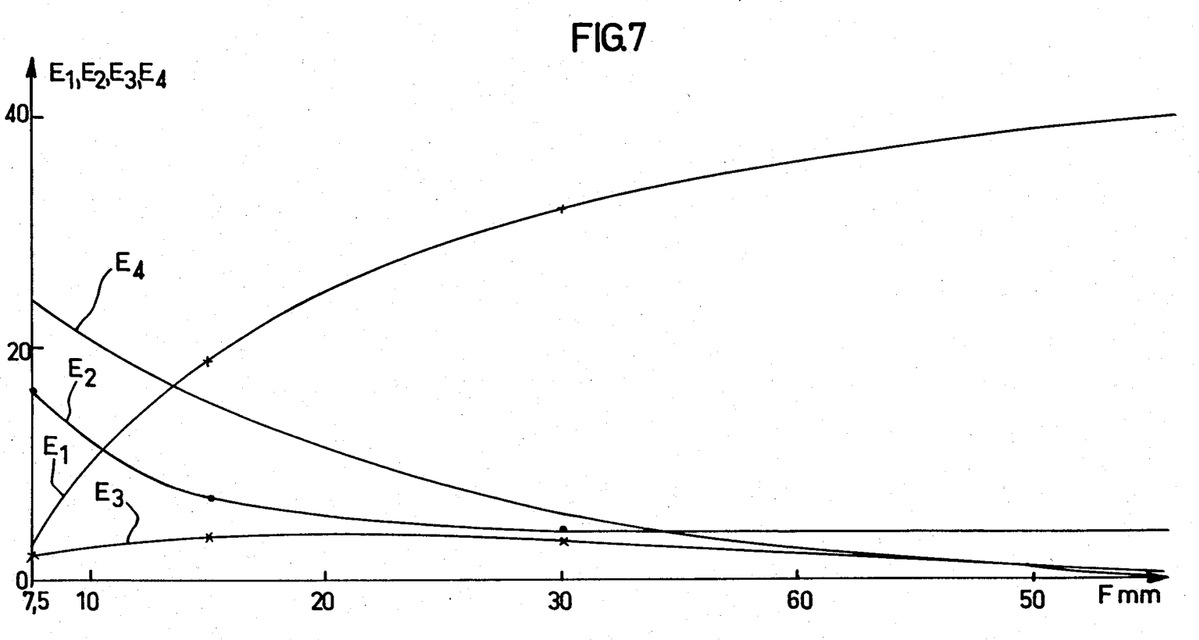
FIG. 7 represents diagrams relating to the movements of the movable components of the objective represented in FIGS. 6a, 6b, 6c, 6d.

Said focal length varies from 7.5 mm to 60 mm when the movable lenses perform the movements represented by the curves of FIG. 7. In this Figure, which is analogous to FIG. 5, the movement of the movable lenses is represented by variations as a function of the focal length F of the distances $E_1$ to $E_4$ on the optical axis, namely $E_1$ between the dioptric surfaces 5 and 6
$E_2$ between the dioptric surfaces 7 and 8
$E_3$ between the dioptric surfaces 9 and 10
$E_4$ between the dioptric surfaces 11 and 12.

The image distance of the objective is of the order of 22.2 mm.

Said objectives in accordance with the invention may be used in camera equipment. A variant of this application is a colour camera comprising three camera tubes for blue, green and red respectively. An objective with a long image distance (greater than or equal to 22 mm) is selected, which enables a colour-splitting prism to be included between the objective and the camera. The objective described with reference to FIG. 3, which is designed so that it already incorporates said trichromatic separating prism, is particularly suitable for this application. In another variant of this application the camera equipment is formed by a simple camera with photosensitive film or a colour camera which comprising only one camera tube. It is then not necessary to include a trichromatic separating prism between the objective and the camera. The objective in accordance with the invention may then have a small image distance (smaller than 22 mm).

What is claimed is:

1. A variable focal length objective lens for focusing an image of an object at a stationary image plane, said lens having an aperture number between 1.5 and 2 and comprising components, each having at least one lens element, arranged along an optical axis, including:
   (a) first and second stationary components arranged in order between an object field and the stationary image plane, said components having positive focal lengths; and
   (b) first and second movable components each comprising a single element, arranged in order between the first and second stationary components, said first movable component having a negative focal length and said second movable component having a positive focal length, at least one of said single elements having an aspherical surface, said movable components being axially displacable relative to each other to effect a focal length variation of at least 5 to 1.

2. A variable focal length objective lens for focusing an image of an object at a stationary image plane, said lens having an aperture number between 1.5 and 2 and comprising components, each having at least one lens element arranged along an optical axis, including:
   (a) first and second stationary components arranged in order between an object field and the stationary image plane, said first stationary component having a focal length $F_1$; and
   (b) first, second and third movable components, each comprising a single element, arranged in order between the first and second stationary components and having focal lengths $F_2$, $F_3$ and $F_4$, respectively, where $F_2/F_1$ and $F_3/F_1$ are negative and $F_4/F_1$ is positive, at least one of said single elements having an aspherical surface, said movable components being axially displaceable relative to each other to effect a focal length variation of at least 5 to 1.

3. A variable focal length objective lens for focusing an image of an object at a stationary image plane, said lens having a free image distance greater than 22 mm and comprising components, each having at least one lens element arranged along an optical axis, including:
(a) first and second stationary components arranged in order between an object field and the stationary image plane, said components having positive focal lengths; and
(b) first and second movable components, each comprising a single element, arranged in order between the first and second stationary components, said first movable component having a negative focal length and said second movable component having a positive focal length, at least one of said single elements having an aspherical surface, said movable components being axially displacable relative to each other to effect a focal length variation of at least 5 to 1.

4. A variable focal length objective lens for focusing an image of an object at a stationary image plane, said lens having a free image distance greater than 22 mm and comprising components, each having at least one lens element, arranged along an optical axis, including:
(a) first and second stationary components arranged in order between an object field and the stationary image plane, said first stationary component having a focal length $F_1$; and
(b) first, second and third movable components, each comprising a single element, arranged in order between the first and second stationary components and having focal lengths $F_2$, $F_3$ and $F_4$, respectively, where $F_2/F_1$ and $F_3/F_1$ are negative and $F_4/F_1$ is positive, at least one of said single elements having an aspherical surface, said movable components being axially displaceable relative to each other to effect a focal length variation of at least 5 to 1.

5. A variable focal length objective lens as in claim 3 or 4, characterized in that the aperture is F/1.8, and having the physical characteristics specified in the following Tables I and II, where the dioptric surfaces of the objective are designated 1 to 17 from the object field to the image field, where E designates axial distances between designated surfaces for a focal length F=7.97 mm, where n designates the refractive index, where $\nu$ designates the Abbe dispersion number, and where the symbols C, $\lambda$, $\epsilon_i$ represent coefficients in the following equation describing the cross sections of the aspherical dioptric surfaces 7, 8, 10 in a plane which passes through the optical axis $$x = \frac{Cy^2}{1 + \sqrt{1 - (1 + \lambda)C^2 \cdot y^2}} + \sum_{i=2}^{i=n} \epsilon_i y^{2i}$$

the abscissa x being measured from the apex of the dioptric surface along the optical axis, and the ordinate perpendicularly to said axis:

TABLE I

| Dioptric surface | E (mm) | R (mm) | n | $\nu$ |
|---|---|---|---|---|
| 1 |  | 111.111 |  |  |
|  | 2.962 |  | 1.704485 | 29.88 |
| 2 |  | 43.910 |  |  |
|  | 11.099 |  | 1.622857 | 60.11 |
| 3 |  | 876.647 |  |  |

TABLE I-continued

| Dioptric surface | E (mm) | R (mm) | n | $\nu$ |
|---|---|---|---|---|
|  | 0.050 |  | 1.000000 |  |
| 4 |  | 53.395 |  |  |
|  | 6.503 |  | 1.622857 | 60.11 |
| 5 |  | 129.296 |  |  |
|  | 2.936 |  | 1.000000 |  |
| 6 |  | −17.988 |  |  |
|  | 1.113 |  | 1.591288 | 60.94 |
| 7 |  | 8.261 |  |  |
|  | 1.896 |  | 1.000000 |  |
| 8 |  | 35.029 |  |  |
|  | 3.452 |  | 1.550192 | 53.17 |
| 9 |  | −39.013 |  |  |
|  | 59.841 |  | 1.000000 |  |
| 10 |  | 25.384 |  |  |
|  | 2.982 |  | 1.654317 | 38.91 |
| 11 |  | −62.563 |  |  |
|  | 7.889 |  | 1.000000 |  |
| 12 |  | 309.102 |  |  |
|  | 3.025 |  | 1.622857 | 60.11 |
| 13 |  | −18.230 |  |  |
|  | 0.050 |  | 1.000000 |  |
| 14 |  | −68.031 |  |  |
|  | 0.802 |  | 1.812529 | 25.30 |
| 15 |  | 13.760 |  |  |
|  | 1.032 |  | 1.000000 |  |
| 16 |  | 25.702 |  |  |
|  | 2.625 |  | 1.622857 | 60.11 |
| 17 |  | −30.820 |  |  |
|  | 0.000 |  | 1.000000 |  |

Focal-length variation F: 7.95 to 63.50 mm
Image distance: 22.14 mm
Objective length: 108.25 mm

TABLE II

| Dioptric surface | 7 | 8 | 10 |
|---|---|---|---|
| C | $1.21048 \ 10^{-1}$ | $2.85479 \ 10^{-2}$ | $3.93954 \ 10^{-2}$ |
| $\lambda$ | $-1.42139$ | $-1.07632$ | $-2.90598$ |
| $\epsilon_2$ | $-1.68578 \ 10^{-4}$ | $-1.89696 \ 10^{-5}$ | $-2.27969 \ 10^{-5}$ |
| $\epsilon_3$ | $2.73671 \ 10^{-6}$ | $3.04327 \ 10^{-7}$ | $-1.91999 \ 10^{-7}$ |
| $\epsilon_4$ | $-6.58215 \ 10^{-8}$ | $-5.01920 \ 10^{-9}$ | $1.14049 \ 10^{-9}$ |
| $\epsilon_5$ | $5.46590 \ 10^{-10}$ | $2.90044 \ 10^{-11}$ | $-1.55755 \ 10^{-11}$ |

6. A variable focal length objective lens as in claim 3 or 4, characterized in that the aperture is F/1.8, and having the physical characteristics specified in the following Tables V and VI, where the dioptric surfaces of the objective are designated 1 to 11 from the object field to the image field, where E designates the axial distance between designated surfaces for the focal length F=17 mm, where n designates the refractive index, where $\nu$ designates the Abbe dispersion number, and where the symbols, C, $\lambda$, $\epsilon_i$ represent coefficients in the following equation describing the cross sections of the aspherical dioptric surfaces 2, 3, 5, 8, 9 in a plane which passes through the optical axis $$x = \frac{Cy^2}{1 + \sqrt{1 - (1 + \lambda)C^2 \cdot y^2}} + \sum_{i=2}^{i=n} \epsilon_i y^{2i}$$

the abscissa x being measured from the apex of the dioptric surface along the optical axis and the ordinate perpendicularly to said axis:

TABLE V

| Dioptric surface | E (mm) | R (mm) | n | $\nu$ |
|---|---|---|---|---|
| 1 |  | 62.852 |  |  |
|  | 6.300 |  | 1.677623 | 32.08 |
| 2 |  | 17.997 |  |  |

TABLE V-continued

| Dioptric surface | E (mm) | R (mm) | n | ν |
|---|---|---|---|---|
| 3 | 31.400 | | 1.000000 | |
| | | 31.080 | | |
| | 10.395 | | 1.622857 | 60.11 |
| 4 | | 403.858 | | |
| | 1.100 | | 1.000000 | |
| 5 | | 50.717 | | |
| | 9.458 | | 1.622857 | 60.11 |
| 6 | | −279.735 | | |
| | 1.750 | | 1.000000 | |
| 7 | | −33.369 | | |
| | 0.866 | | 1.622857 | 60.11 |
| 8 | | 21.567 | | |
| | 52.400 | | 1.000000 | |
| 9 | | 18.083 | | |
| | 5.662 | | 1.622857 | 60.11 |
| 10 | | −10.914 | | |
| | 0.396 | | 1.812529 | 25.30 |
| 11 | | −21.976 | | |
| | 0.000 | | 1.000000 | |

Focal-length variation F: 7.0 to 56.0 mm.
Image distance: 22.19 mm.
Length 2: 120.42 mm

TABLE VI

| Dioptric surface | 2 | 3 | 5 | 8 | 9 |
|---|---|---|---|---|---|
| C | $5.55650 \cdot 10^{-2}$ | $3.21750 \cdot 10^{-2}$ | $1.97173 \cdot 10^{-2}$ | $4.63672 \cdot 10^{-2}$ | $5.53002 \cdot 10^{-2}$ |
| λ | $-6.96979 \cdot 10^{-1}$ | $-1.13548$ | $-9.75088 \cdot 10^{-1}$ | $-1.52017 \cdot 10^{-1}$ | $-7.10788 \cdot 10^{-1}$ |
| $\epsilon_2$ | $-5.38859 \cdot 10^{-6}$ | $-9.88210 \cdot 10^{-7}$ | $1.30489 \cdot 10^{-6}$ | $-1.14601 \cdot 10^{-5}$ | $-1.99591 \cdot 10^{-5}$ |
| $\epsilon_3$ | $-9.03598 \cdot 10^{-9}$ | $-1.03273 \cdot 10^{-9}$ | $-3.89438 \cdot 10^{-10}$ | $9.99829 \cdot 10^{-8}$ | $2.71237 \cdot 10^{-8}$ |
| $\epsilon_4$ | $3.92014 \cdot 10^{-12}$ | $1.46391 \cdot 10^{-12}$ | $-6.31723 \cdot 10^{-13}$ | $-8.14572 \cdot 10^{-10}$ | $1.99891 \cdot 10^{-9}$ |
| $\epsilon_5$ | 0.00000 | 0.00000 | 0.00000 | 0.00000 | 0.00000 |

7. A variable focal length objective lens as in claim 3 or 4, characterized in that the aperture is equal to F/1.8, and having the physical characteristics specified in the following Tables VII and VIII, where the dioptric surfaces of the objective are designated 1 to 16 from the object field to the image field, where E designates the axial distance between designated surfaces for the focal length F=15.00 mm, where n designates the refractive index, where ν designates the Abbe dispersion number, and where the symbols C, λ, $\epsilon_i$ represent coefficients in the following equation describing the cross sections of the aspherical dioptric surfaces 4, 7, 12, 16 in a plane passing through the optical axis $$x = \frac{Cy^2}{1 + \sqrt{1 - (1 + \lambda)C^2 \cdot y^2}} + \sum_{i=2}^{i=n} \epsilon_i y^{2i},$$

the abscissa x being measured from the apex of the dioptric surface along the optical axis and the ordinate perpendicularly to said axis:

TABLE VII

| Dioptric surface | E (mm) | R (mm) | n | ν |
|---|---|---|---|---|
| 1 | | 52.985 | | |
| | 2.499 | | 1.734359 | 28.17 |
| 2 | | 31.271 | | |
| | 13.466 | | 1.622857 | 60.11 |
| 3 | | 180.118 | | |
| | 0.050 | | 1.000000 | |
| 4 | | 60.986 | | |
| | 5.533 | | 1.622857 | 60.11 |
| 5 | | 184.952 | | |
| | 19.067 | | 1.000000 | |
| 6 | | −318.707 | | |
| | 0.940 | | 1.591288 | 60.94 |
| 7 | | 11.422 | | |
| | 7.021 | | 1.000000 | |
| 8 | | −10.909 | | |
| | 0.636 | | 1.591288 | 60.94 |
| 9 | | −136.669 | | |
| | 3.649 | | 1.000000 | |
| 10 | | 135.620 | | |
| | 1.848 | | 1.734359 | 28.17 |
| 11 | | −24.210 | | |
| | 16.404 | | 1.000000 | |
| 12 | | −39.414 | | |
| 13 | 10.000 | −7.702 | 1.615176 | 58.34 |
| | 0.705 | | 1.812529 | 25.30 |
| 14 | | −13.685 | | |
| | 0.969 | | 1.000000 | |
| 15 | | −99.112 | | |
| | 2.417 | | 1.622857 | 60.11 |
| 16 | | −14.931 | | |
| | 000 | | 1.000000 | |

Focal-length variation F: 7.5 to 60 mm
Image distance: 22.20 mm
Length: 85.20 mm.

TABLE VIII

| Dioptric surface | 4 | 7 | 12 | 16 |
|---|---|---|---|---|
| C | $1.63972 \cdot 10^{-2}$ | $8.75499 \cdot 10^{-2}$ | $-2.53715 \cdot 10^{-2}$ | $-6.69741 \cdot 10^{-2}$ |
| λ | $1.68233 \cdot 10^{-1}$ | $-7.55918 \cdot 10^{-1}$ | 0.00000 | 00000 |
| $\epsilon_2$ | $-5.59326 \cdot 10^{-8}$ | $1.61978 \cdot 10^{-5}$ | $-2.23860 \cdot 10^{-4}$ | $-3.68018 \cdot 10^{-6}$ |
| $\epsilon_3$ | $1.644888 \cdot 10^{-10}$ | $-4.29937 \cdot 10^{-7}$ | $-1.06579 \cdot 10^{-6}$ | $2.28552 \cdot 10^{-8}$ |
| $\epsilon_4$ | 0.00000 | 0.00000 | 0.00000 | 0.00000 |
| $\epsilon_5$ | 0.00000 | 0.00000 | 0.00000 | 0.00000 |

8. A variable focal length objective lens for focusing an image of an object at a stationary image plane, said lens having a free image distance smaller than 22 mm and comprising components, each having at least one lens element, arranged along an optical axis, including:
(a) first and second stationary components arranged in order between an object field and the stationary image plane, said components having positive focal lengths; and
(b) first and second movable components, each comprising a single element, arranged in order between the first and second stationary components, said first movable component having a negative focal length and said second movable component having a positive focal length, at least one of said single elements having an aspherical surface, said movable components being axially displaceable relative to each other to effect a focal length variation of at least 5 to 1.

9. A variable focal length objective lens for focusing an image of an object at a stationary image plane, said lens having a free image distance smaller than 22 mm and comprising components, each having at least one lens element, arranged along an optical axis, including:
(a) first and second stationary components arranged in order between an object field and the stationary image plane, said first stationary component having a focal length $F_1$; and
(b) first, second and third movable components, each comprising a single element, arranged in order between the first and second stationary components and having focal lengths $F_2$, $F_3$ and $F_4$, respectively, where $F_2/F_1$ and $F_3/F_1$ are negative and $F_4/F_1$ is positive, at least one of said single elements having an aspherical surface, said movable components being axially displaceable relative to each other to effect a focal length variation of at least 5 to 1.

10. A variable focal length objective lens as in claim 8 or 9, characterized in that the aperture is F/1.8, and having the physical characteristics specified in the following Tables III and IV, where the dioptric surfaces of the objective are designated 1 to 20 from the object field to the image field, where E designates the axial distance between designated surfaces for the focal length F=7.90 mm, where n designates the refractive index, where $\nu$ designates the Abbe dispersion number, and where the symbols C, $\lambda$, $\epsilon_i$ represent coefficients in the following equation describing the cross sections of the aspherical dioptric surfaces 7, 8, 10 in a plane which passes through the optical axis $$x = \frac{Cy^2}{1 + \sqrt{1 - (1/\lambda)C^2 \cdot y^2}} + \sum_{i=2}^{i=n} \epsilon_i y^{2i}$$

the abscissa x being measured from the apex of the dioptric surface along the optical axis and the ordinate perpendicularly to said axis:

TABLE III

| Dioptric surface | E (mm) | R (mm) | n | $\nu$ |
|---|---|---|---|---|
| 1 | | 115.145 | | |
| | 2.935 | | 1.723153 | 29.26 |
| 2 | | 46.191 | | |
| | 11.768 | | 1.622857 | 60.11 |
| 3 | | −248.840 | | |
| | 0.050 | | 1.000000 | |
| 4 | | 63.147 | | |
| | 5.243 | | 1.622857 | 60.11 |
| 5 | | 135.414 | | |
| | 2.507 | | 1.000000 | * |
| 6 | | −19.756 | | |
| | 0.688 | | 1.591288 | 60.94 |
| 7 | | 11.786 | | |
| | 3.279 | | 1.000000 | |
| 8 | | 237.568 | | |
| | 1.680 | | 1.584777 | 40.53 |
| 9 | | −51.022 | | |
| | 59.431 | | 1.000000 | |
| 10 | | 42.857 | | |
| | 2.329 | | 1.584777 | 40.53 |
| 11 | | −31.066 | | |
| | 7.373 | | 1.000000 | |
| 12 | | 550.809 | | |
| | 3.487 | | 1.622857 | 60.11 |
| 13 | | −16.221 | | |
| | 0.040 | | 1.000000 | |
| 14 | | −401.781 | | |
| | 0.788 | | 1.812529 | 25.30 |
| 15 | | 13.928 | | |
| | 1.259 | | 1.000000 | |
| 16 | | 42.759 | | |
| | 2.200 | | 1.622857 | 60.11 |
| 17 | | −26.586 | | |
| | 0.050 | | 1.000000 | |
| 18 | | ∞ | | |
| | 26.500 | | 1.518727 | 64.04 |
| 19 | | ∞ | | |
| | 0.000 | | 1.000000 | |

Focal-length variation F: 7.90 to 64 mm.
Image distance after prism: 4.25 mm
Length: 131.66 mm

TABLE IV

| Dioptric surface | 7 | 8 | 10 |
|---|---|---|---|
| C | $8{,}48454 \cdot 10^{-2}$ | $4{,}20932 \cdot 10^{-3}$ | $2{,}33336 \cdot 10^{-2}$ |
| $\lambda$ | $-8{,}64111 \cdot 10^{-1}$ | $-6{,}87745 \cdot 10^{-2}$ | $-5{,}06288$ |
| $\epsilon_2$ | $-1{,}01718 \cdot 10^{-4}$ | $2{,}05245 \cdot 10^{-6}$ | $-7{,}45166 \cdot 10^{-5}$ |
| $\epsilon_3$ | $-1{,}33362 \cdot 10^{-7}$ | $-4{,}29973 \cdot 10^{-8}$ | $-2{,}89507 \cdot 10^{-7}$ |
| $\epsilon_4$ | $-1{,}23607 \cdot 10^{-8}$ | $1{,}41858 \cdot 10^{-9}$ | $1{,}75248 \cdot 10^{-9}$ |
| $\epsilon_5$ | $1{,}19575 \cdot 10^{-10}$ | $-1{,}73662 \cdot 10^{-11}$ | $-5{,}15778 \cdot 10^{-11}$ |

* * * * *